(12) United States Patent
Benco et al.

(10) Patent No.: US 7,805,138 B2
(45) Date of Patent: Sep. 28, 2010

(54) NETWORK SUPPORT FOR ROAMING OPTIMIZATION

(75) Inventors: David S. Benco, Winfield, IL (US);
Sanjeev Mahajan, Naperville, IL (US);
Baoling S. Sheen, Naperville, IL (US);
Sandra L. True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/583,912

(22) Filed: Aug. 27, 2009

(65) Prior Publication Data

US 2009/0318141 A1    Dec. 24, 2009

(51) Int. Cl.
*H04W 4/00* (2009.01)
*H04W 36/00* (2009.01)

(52) U.S. Cl. ............. 455/432.1; 455/432.3; 455/435.2; 455/436

(58) Field of Classification Search ......... 455/436–444, 455/432.1–432.3, 435.1–435.3, 552.1; 370/331–333, 370/334
See application file for complete search history.

(56) References Cited

U.S. PATENT DOCUMENTS 6,393,279 B1 *   5/2002   Lee ........................ 455/426.1

* cited by examiner

*Primary Examiner*—George Eng
*Assistant Examiner*—Nam Huynh
(74) *Attorney, Agent, or Firm*—Carmen Patti Law Group, LLC

(57) ABSTRACT

An apparatus in one example has: a home network and at least one partner network; a mobile terminal associated with the home network; a high threshold for use when the mobile terminal roams from the home network to the partner network; and a minimum threshold for use when the mobile terminal roams from the partner network to the home network.

27 Claims, 3 Drawing Sheets

NETWORK SUPPORT FOR ROAMING OPTIMIZATION

TECHNICAL FIELD

The invention relates generally to telecommunications and more particularly to telecommunication system that has roaming for mobile terminals.

BACKGROUND

Many mobile service providers engage in cooperative "roaming agreements" with other mobile service providers. The advantage of such agreements is that not every service provider must expend the capital to provide cellular coverage in all geographic areas, particularly in rural areas. Roaming agreements therefore allow a mobile subscriber to roam between service provider networks without any interruption in service. One disadvantage of this arrangement, however, is that the trigger for roaming into a different network is bi-directionally symmetric (i.e., the same criteria is used to roam out of the "home" network as to roam back into it). This symmetry results in a possible overload of any one service provider network for its "home" subscribers as well as higher-than-necessary roaming charges to mobile subscribers when the subscriber is not returned to the "home" network as early as possible.

When a mobile terminal moves from a home network to another network, a handoff occurs. Mobile assisted soft handoff in conjunction with signal diversity combining is the method of relaying user communication signals on the transmission segment between a mobile terminal and a mobile switching center concurrently via a first and a second base station in the uplink and downlink direction and performing signal diversity reception at the mobile terminal and mobile switching center in order to enhance the user signal quality. This method is invoked by the mobile switching center when a mobile terminal communicating initially with a base station has moved into the overlapping coverage areas of this first base station and a second base station and has reported the availability of a sufficiently strong signal from this second base station to the mobile switching center. At no time instant during soft handoff in conjunction with signal diversity combining does the mobile terminal interrupt its communications with the mobile switching center. The mobile switching center typically deploys post-detection/decoding, selective combining of the digitally encoded speech frames.

In order to enable the reporting assistance of the mobile terminal during soft handoff initiation, all base stations may transmit, for example, a code division multiple access (CDMA) downlink reference signal, referred to as a pilot signal. Mobile terminals when roaming throughout the service area of the CDMA cellular telecommunications system periodically demodulate the pilot signals of the various neighboring base stations during an ongoing communication with a first base station and derive a corresponding pilot signal quality indication. This indication determines a ranked list of candidate base stations for handoff and is transmitted in the form of signaling information to the mobile switching center. It should be understood that also the first base station may perform continuously CDMA uplink signal quality strength and measurements and based upon these observations may give a soft handoff request indication to the mobile switching center.

Usually, soft handoff in conjunction with signal diversity combining is initiated by the mobile switching center if the mobile terminal reports that the pilot signal quality of a second base station in addition to that of the first base station is sufficiently good according to the predetermined thresholds made available to the mobile terminal and the mobile switching center as well as the second base station can obtain the required resources for the soft handoff transition. Subsequently, the mobile terminal will be instructed by the mobile switching center via the first base station by means of signaling to initiate a soft handoff and to commence signal diversity combining on the downlink.

Moreover, the mobile switching center initiates the additional relay of user signals via the second base station and commences diversity combining of the user signal in the uplink direction. Both participating base stations invoke autonomously the previously mentioned closed loop power control method. The mobile terminal sets its CDMA transmit power to the minimum of the two commanded power levels in order to reduce excessive CDMA interference with the other communication links.

Finally, when the mobile terminal is firmly established within the area of the second base station and the pilot signal received from the first base station has weakened sufficiently according to the predetermined thresholds made available to the mobile terminal it will report this condition to the mobile switching center, which in turn decides to terminate the soft handoff with signal diversity combining and will use subsequently only the second base station for maintaining the CDMA communications. One disadvantage of this arrangement is that the trigger for roaming into a different network is bi-directionally symmetric.

Thus, a need exists for an improved telecommunication network that optimizes roaming between service providers by minimizing the duration of off-network roaming.

SUMMARY

The invention in one implementation encompasses an apparatus. The apparatus comprises a high threshold for roaming out of a home network, and a minimum threshold for roaming into the home network.

The invention in a further implementation encompasses an apparatus. The apparatus comprises a home network and at least one partner network; a mobile terminal associated with the home network; a high threshold for use when the mobile terminal roams from the home network to the partner network; and a minimum threshold for use when the mobile terminal roams from the partner network to the home network.

Another implementation of the invention encompasses a method. The method comprises: conducting a telephone call for a mobile terminal; roaming from a home network when a high threshold is exceeded; and returning to the home network when a minimum threshold is met.

DESCRIPTION OF THE DRAWINGS

Features of exemplary implementations of the invention will become apparent from the description, the claims, and the accompanying drawings in which:

DETAILED DESCRIPTION

The present telecommunication system establishes and implements roaming criteria that may have a high threshold for roaming out of the home network, and low threshold for roaming back into the home network. A present methodology for the telecommunications network provides optimal roaming back into the home network.

Figure 1:
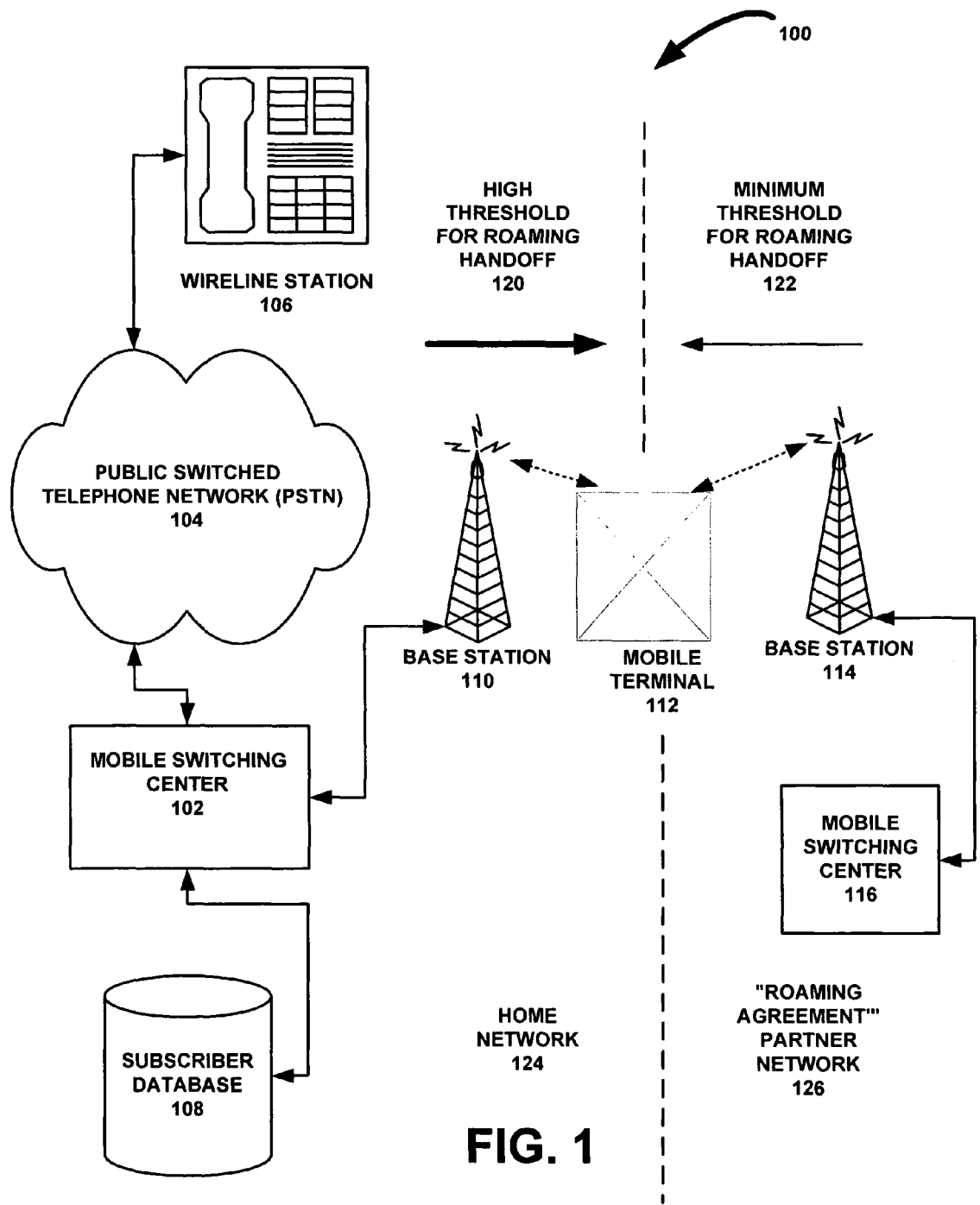
FIG. 1 is a representation of one implementation of an apparatus that comprises a telecommunication system that has roaming for mobile terminals.

Turning to FIG. 1, an apparatus 100 in one example comprises a home network 124 and at least one "roaming agreement" partner network 126. Typically, there will be a number of partner networks. The home network 124 may have a mobile switching center (MSC) 102. The network 124 may be, or may be part of, one or more of a telephone network, a local area network ("LAN"), the Internet, and a wireless network. In the depicted embodiment, a public switched telephone network (PSTN) 104 is connected to the MSC 102. The PSTN 104 routes calls to and from mobile users 112 through the MSC 102. The PSTN 104 also routes calls from and to wireline stations 106. The MSC 102 may also be connected to one or more base stations (BS) 110. Each of the base stations 110 communicates with mobile terminal(s) 112 in its service area using a subscriber database 108. The PSTN 104 generally may be implemented as the worldwide voice telephone network accessible to all those with telephones and access privileges (e.g., AT&T long distance network).

Similarly, the partner network 126 may have a MSC 116 operatively connected to a base station 114. Roaming occurs when the mobile terminal moves from one of the home network and the partner network to the other. When the high threshold for roaming handoff 120 is exceeded, the mobile terminal 112 roams from the home network 124 to the partner network 126, and, when the minimum threshold 122 is met, the mobile terminal 112 roams from the partner network 126 to the home network 124.

The apparatus 100 in one example may comprise a plurality of components such as one or more of electronic components, hardware components, and computer software components. A number of such components may be combined or divided in the apparatus 100.

The apparatus 100 in one example may employ one or more computer-readable signal-bearing media. The computer-readable signal-bearing media may store software, firmware and/or assembly language for performing one or more portions of one or more embodiments. Examples of a computer-readable signal-bearing medium for the apparatus 100 may comprise the recordable data storage medium (subscriber database 108). The computer-readable signal-bearing medium for the apparatus 100 in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus 100, for instance, one or more of a telephone network, a local area network ("LAN"), a wide area network ("WAN"), the Internet, and a wireless network.

Figure 2:
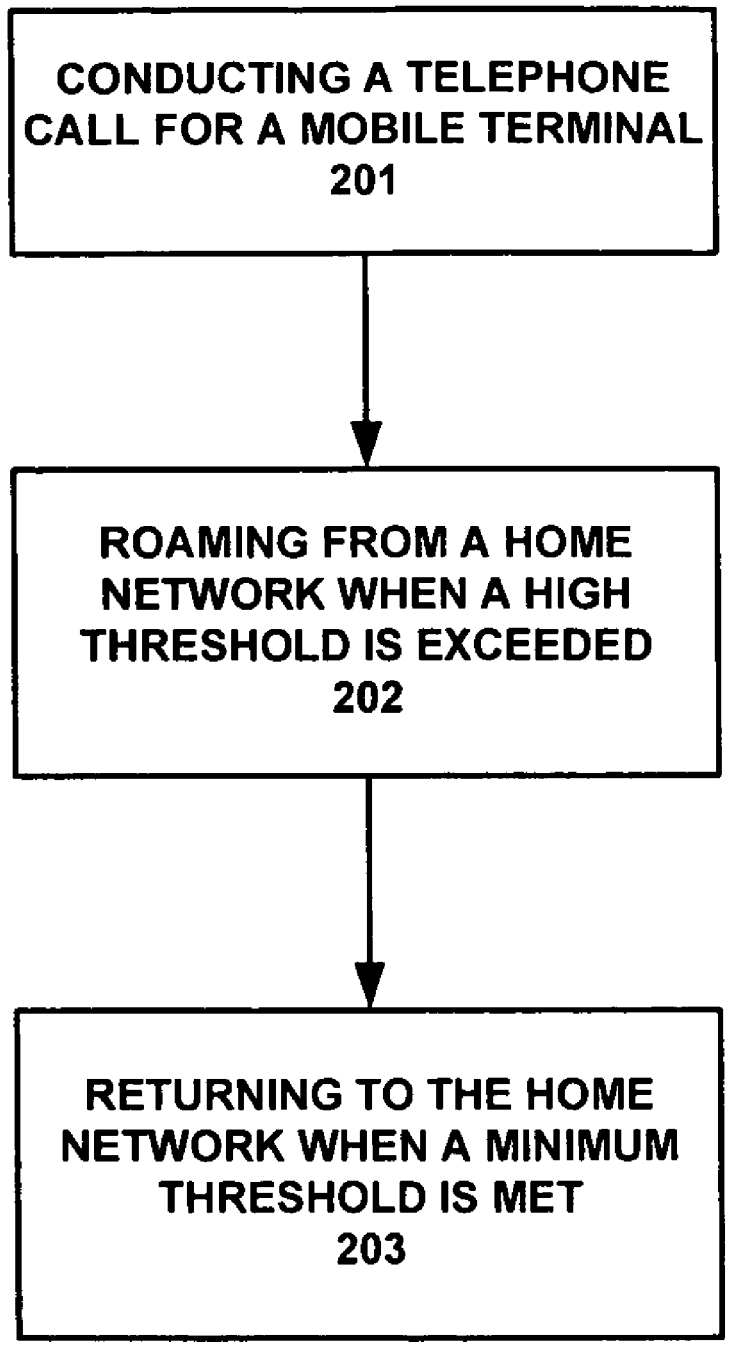
FIG. 2 is a representation of one exemplary flow diagram for the roaming feature of the apparatus of FIG. 1.

FIG. 2 is a representation of one exemplary flow diagram for the roaming feature of the apparatus of FIG. 1. This implementation of the present method may comprise: conducting a telephone call for a mobile terminal (201); roaming from a home network when a high threshold is exceeded (202); and returning to the home network when a minimum threshold is met (203).

In general, when the high threshold is exceeded, the mobile terminal roams from the home network to a partner network, and, when the minimum threshold is met, the mobile terminal roams from the partner network to the home network. As one example, the high threshold may be a predetermined high signal strength from $\geq 3$ off-network cells, that is, a mobile's rake receiver has detected a signal strength in excess of a predetermined level (the high threshold) from each of 3 off-network cells; and the minimum threshold may be a predetermined minimum signal strength from $\geq 2$ off-network cells, that is, the mobile's rake receiver has detected an acceptable signal strength (exceeds the low threshold) from only 2 off-network cells. As another example, the high threshold may be a best signal from a predetermined off-network cell, and the minimum threshold may be an absence of a best signal from a predetermined off-network cell; in this example, the signal strength from a predetermined cell (usually a cell which borders the two networks) is used in handoff determination—handoff into a partner network would occur only when the predetermined cell in the partner network offered the highest signal strength, and handoff into the home network would occur as soon as the mobile did not receive the strongest signal from the predetermined off-network cell.

In one implementation, when the high threshold is exceeded, the mobile terminal roams from the home network to a partner network, and the roaming mobile terminal may continue the call. Alternatively, when the high threshold is exceeded, the mobile terminal roams from the home network to a partner network, and the roaming mobile terminal may place a new call in the partner network.

Figure 3:
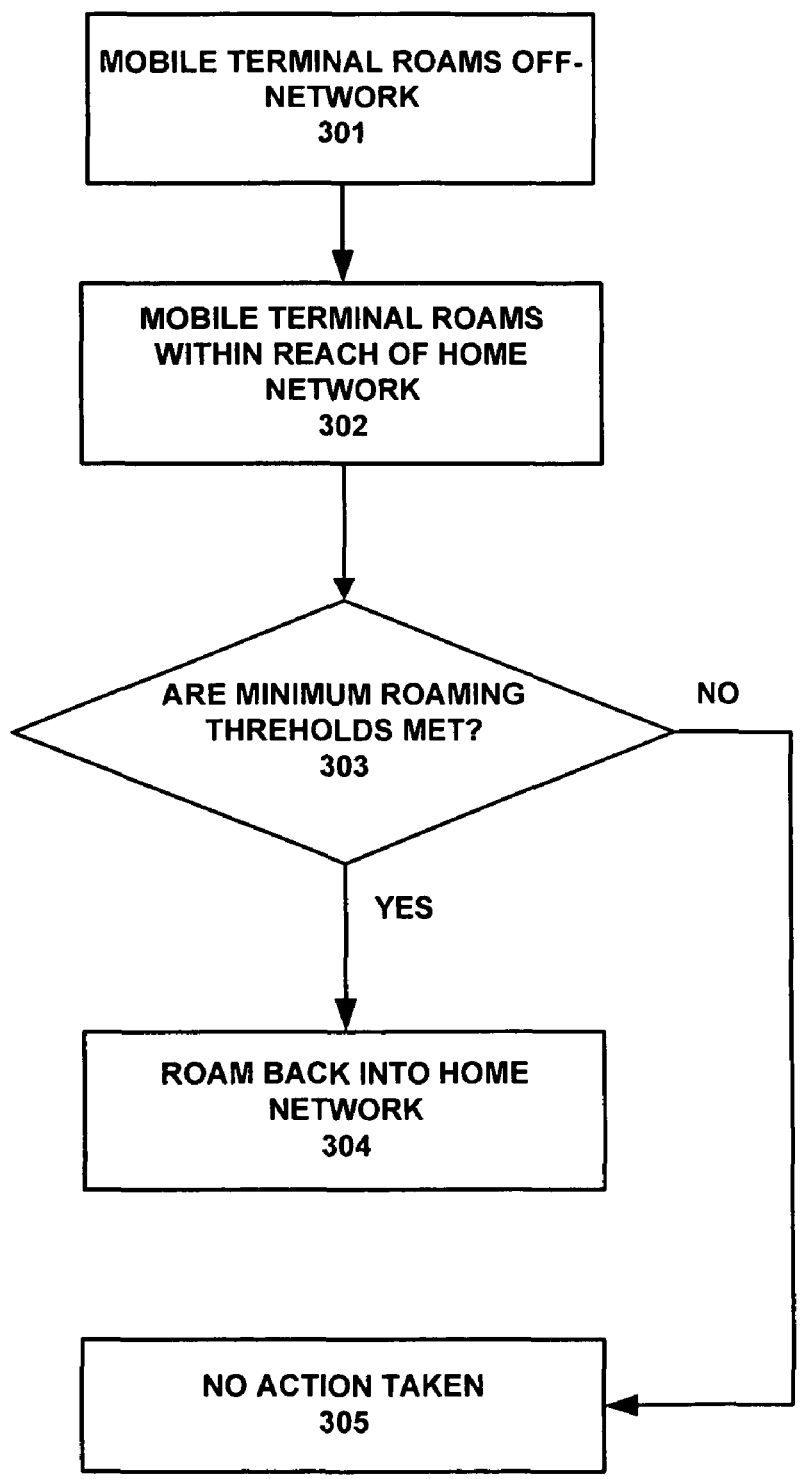
FIG. 3 is a representation of one exemplary flow diagram for the roaming feature of the apparatus of FIG. 1.

FIG. 3 is a representation of another exemplary flow diagram for the roaming feature of the apparatus of FIG. 1. This implementation of the present method may comprise: a mobile terminal roaming off-network (301); the mobile terminal roaming within reach of the home network (302); determining if minimum roaming thresholds have been met (303); roaming back into the home network when the minimum thresholds are met (304); and taking no action when the minimum thresholds are not met (305).

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A system, comprising:
   a high threshold for roaming out of a home network;
   a minimum threshold for roaming into the home network;
   a mobile terminal for use in the home network and at least one roaming agreement partner network; and
   a roaming criteria in the home network and in the at least one roaming agreement partner network that is structured
   such that, when the high threshold is exceeded, the mobile terminal always roams out of the home network and, when the minimum threshold is met, the mobile terminal immediately roams into the home network;
   such that handoff into a roaming agreement partner network occurs only when a predetermined cell in the roaming agreement partner network offered the highest signal strength, and handoff into the home network occurs as soon as the mobile terminal did not receive the strongest signal from the roaming agreement predetermined off-network cell; and such that the high threshold being exceeded occurs when the mobile terminal has detected a signal strength in excess of the high threshold from each off-network cell of a first predetermined number of off-network cells, wherein the minimum threshold is met when the mobile terminal has detected a signal strength that exceeds the low threshold from each off-network cell of a second predetermined number of off-network cells, and wherein the first predetermined number is greater than the second predetermined number.

2. The system according to claim 1, wherein the first predetermined number of off-network cells is 3 off-network cells.

3. The system according to claim 1, wherein the high threshold is a best signal from a predetermined off-network cell.

4. The system according to claim 1, wherein the second predetermined number of off-network cells is 2 off-network cells.

5. The system according to claim 1, wherein the minimum threshold is an absence of a best signal from a predetermined off-network cell.

6. The system according to claim 1, wherein, when the high threshold is exceeded, the mobile terminal roams from the home network to a partner network, and wherein the roaming mobile terminal continues the call.

7. The system according to claim 1, wherein, when the high threshold is exceeded, the mobile terminal roams from the home network to a partner network, and wherein the roaming mobile terminal places a new call in the partner network.

8. A system, comprising:
a home network and at least one partner network;
a mobile terminal associated with the home network;
a high threshold for use when the mobile terminal roams from the home network to the partner network; and
a minimum threshold for use when the mobile terminal roams from the partner network to the home network;
wherein, when the high threshold is exceeded, the mobile terminal always roams out of the home network and wherein, when the minimum threshold is met, the mobile terminal immediately roams into the home network;
wherein handoff into a partner network occurs only when a predetermined cell in a partner network offered the highest signal strength, and handoff into the home network occurs as soon as the mobile terminal did not receive the strongest signal from a predetermined off-network cell;
wherein the high threshold being exceeded occurs when a rake receiver of the mobile terminal has detected a signal strength in excess of the high threshold from each off-network cell of a first predetermined number of off-network cells, wherein the minimum threshold is met when the rake receiver of the mobile terminal has detected a signal strength that exceeds the low threshold from each off-network cell of a second predetermined number of off-network cells, and wherein the first predetermined number is greater than the second predetermined number.

9. The system according to claim 8, wherein the first predetermined number of off-network cells is 3 off-network cells.

10. The system according to claim 8, wherein the high threshold is a best signal from a predetermined off-network cell.

11. The system according to claim 8, wherein the second predetermined number of off-network cells is 2 off-network cells.

12. The system according to claim 8, wherein the minimum threshold is an absence of a best signal from a predetermined off-network cell.

13. A method, comprising the steps of:
conducting a telephone call for a mobile terminal;
roaming from a home network when a high threshold is exceeded; and
returning to the home network when a minimum threshold is met;
wherein, when the high threshold is exceeded, the mobile terminal always roams out of the home network and wherein, when the minimum threshold is met, the mobile terminal immediately roams into the home network;
wherein handoff into a partner network occurs only when a predetermined cell in a partner network offered the highest signal strength, and handoff into the home network occurs as soon as the mobile terminal did not receive the strongest signal from a predetermined off-network cell;
wherein the high threshold being exceeded occurs when a rake receiver of the mobile terminal has detected a signal strength in excess of the high threshold from each off-network cell of a first predetermined number of off-network cells, wherein the minimum threshold is met when the rake receiver of the mobile terminal has detected a signal strength that exceeds the low threshold from each off-network cell of a second predetermined number of off-network cells, and wherein the first predetermined number is greater than the second predetermined number.

14. The method according to claim 13, wherein the first predetermined number of off-network cells is 3 off-network cells, and wherein the second predetermined number of off-network cells is 2 off-network cells.

15. The method according to claim 13, wherein the high threshold is a best signal from a predetermined off-network cell, and wherein the minimum threshold is an absence of a best signal from a predetermined off-network cell.

16. A system for use with a roaming criteria for defining at least one trigger for roaming out of a network and for roaming into the network, comprising:
a high threshold for use in a handoff out of the home network, handoff out of the home network occurring when the high threshold is exceeded; and
a minimum threshold for use in a handoff into the home network, handoff to the home network occurring when the minimum threshold is met;
handoff out of the home network effected only when at least one signal having an out-of-network strongest signal strength is received, and handoff into the home network effected as soon as the at least one signal having the out-of-network strongest signal strength is not received;
one trigger being when the high threshold is exceeded which is when signal strengths are in excess of the high threshold from each out-of-network signal of a first predetermined number of out-of-network signals;
another trigger being when the minimum threshold is met which is when signal strengths are in excess of the low threshold from out-of-network signal of a second predetermined number of out-of-network signals; and the first predetermined number being greater than the second predetermined number.

17. The system according to claim 16, wherein the high threshold is a best signal from a predetermined out-of-network signal, and wherein the minimum threshold is an absence of a best signal from a predetermined out-of-network signal.

18. A system for use with a mobile terminal and a roaming criteria for defining at least one trigger for roaming out of a network and for roaming into the network, comprising:
a high threshold for roaming out of a home network;
a minimum threshold for roaming into the home network;
a roaming criteria in the home network that is structured such that, when the high threshold is exceeded, the mobile terminal always roams out of the home network and, when the minimum threshold is met, the mobile terminal immediately roams into the home network; and
wherein one trigger is when the high threshold is exceeded occurs which is when the mobile terminal has detected a signal strength in excess of the high threshold from each off- network cell of a first predetermined number of off-network cells, wherein another trigger is when the minimum threshold is met which is when the mobile terminal has detected a signal strength that exceeds the low threshold from each off-network cell of a second predetermined number of off-network cells, and wherein the first predetermined number is greater than the second predetermined number.

19. The system according to claim 18, wherein the first predetermined number of off-network cells is 3 off-network cells.

20. The system according to claim 18, wherein the high threshold is a best signal from a predetermined off-network cell.

21. The system according to claim 18, wherein the second predetermined number of off-network cells is 2 off-network cells.

22. The system according to claim 18, wherein the minimum threshold is an absence of a best signal from a predetermined off-network cell.

23. The system according to claim 18 wherein, when the high threshold is exceeded, the mobile terminal roams from the home network to a partner network, and wherein the roaming mobile terminal continues the call.

24. The system according to claim 18, wherein, when the high threshold is exceeded, the mobile terminal roams from the home network to a partner network, and wherein the roaming mobile terminal places a new call in the partner network.

25. A method for use with a mobile terminal and a roaming criteria for defining at least one trigger for roaming out of a network and for roaming into the network, comprising the steps of:
defining a high threshold for roaming out of a home network, and defining a first trigger which is when the mobile terminal has detected a signal strength in excess of the high threshold from each off-network cell of a first predetermined number of off-network cells;
defining a minimum threshold for roaming into the home network, and defining a second trigger which is when the minimum threshold is met when the mobile terminal has detected a signal strength that exceeds the low threshold from each off-network cell of a second predetermined number of off-network cells;
structuring the roaming criteria in the home network such that, when the high threshold is exceeded, the mobile terminal always roams out of the home network and, when the minimum threshold is met, the mobile terminal immediately roams into the home network; and
wherein the first predetermined number is greater than the second predetermined number.

26. The method according to claim 25, wherein the first predetermined number of off-network cells is 3 off-network cells, and wherein the second predetermined number of off-network cells is 2 off-network cells.

27. The method according to claim 25, wherein the high threshold is a best signal from a predetermined off-network cell, and wherein the minimum threshold is an absence of a best signal from a predetermined off-network cell.

* * * * *